United States Patent
Kenney et al.

(10) Patent No.: US 9,883,505 B2
(45) Date of Patent: Jan. 30, 2018

(54) HEW PACKET STRUCTURE AND METHOD FOR HIGH-EFFICIENCY WI-FI (HEW) COMMUNICATION

(71) Applicant: Intel IP Corporation, Santa Clara, CA (US)

(72) Inventors: Thomas J. Kenney, Portland, OR (US); Shahrnaz Azizi, Cupertino, CA (US); Eldad Perahia, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 102 days.

(21) Appl. No.: 15/022,477

(22) PCT Filed: Dec. 16, 2013

(86) PCT No.: PCT/US2013/075418
§ 371 (c)(1),
(2) Date: Mar. 16, 2016

(87) PCT Pub. No.: WO2015/076856
PCT Pub. Date: May 28, 2015

(65) Prior Publication Data
US 2016/0234779 A1    Aug. 11, 2016

Related U.S. Application Data

(60) Provisional application No. 61/906,059, filed on Nov. 19, 2013.

(51) Int. Cl.
*G08C 17/00*    (2006.01)
*H04W 72/04*    (2009.01)
(Continued)

(52) U.S. Cl.
CPC ........ *H04W 72/044* (2013.01); *H04B 7/0413* (2013.01); *H04B 7/0452* (2013.01);
(Continued)

(58) Field of Classification Search
CPC . H04W 84/12; H04W 72/0446; H04W 88/08; H04W 72/0413; H04W 72/0453;
(Continued)

(56) References Cited

U.S. PATENT DOCUMENTS 9,344,238 B2 * 5/2016 Vermani ............... H04L 5/0044
9,712,358 B2 * 7/2017 Zhang ................ H04W 52/286
(Continued)

FOREIGN PATENT DOCUMENTS

CN        105637948 A    6/2016
WO    WO-2013022469 A1    2/2013
(Continued)

OTHER PUBLICATIONS

"European Application Serial No. 13897718.6, Extended European Search Report dated Jul. 10, 2017", 9 pgs.
(Continued)

*Primary Examiner* — Michael J Moore, Jr.
(74) *Attorney, Agent, or Firm* — Schwegman Lundberg & Woessner, P.A.

(57) ABSTRACT

Embodiments of a master station and method for communicating in a high-efficiency Wi-Fi (HEW) network are generally described herein. In some embodiments, the master station is arranged to configure an HEW frame for communicating with a plurality of HEW compliant devices. The master station may transmit a master sync transmission that includes synchronization information and may be transmitted at a beginning of an HEW control period. The master station may configure an HEW frame to include an HEW signal field (HEW SIG) as a first field of the frame and may transmit the HEW frame without legacy synchronization information at the beginning of the HEW frame.

20 Claims, 2 Drawing Sheets

(51) Int. Cl.
| | |
|---|---|
| H04W 4/00 | (2009.01) |
| H04L 5/00 | (2006.01) |
| H04L 27/26 | (2006.01) |
| H04B 7/0452 | (2017.01) |
| H04J 11/00 | (2006.01) |
| H04L 29/06 | (2006.01) |
| H04W 24/02 | (2009.01) |
| H04W 56/00 | (2009.01) |
| H04W 52/02 | (2009.01) |
| H04B 7/0413 | (2017.01) |
| H04W 74/04 | (2009.01) |
| H04W 84/12 | (2009.01) |

(52) U.S. Cl.
CPC .............. *H04J 11/00* (2013.01); *H04L 5/005* (2013.01); *H04L 5/0007* (2013.01); *H04L 5/0048* (2013.01); *H04L 5/0053* (2013.01); *H04L 5/0064* (2013.01); *H04L 27/2601* (2013.01); *H04L 27/2602* (2013.01); *H04L 27/2613* (2013.01); *H04L 69/22* (2013.01); *H04W 4/008* (2013.01); *H04W 24/02* (2013.01); *H04W 52/0216* (2013.01); *H04W 52/0219* (2013.01); *H04W 56/002* (2013.01); *H04W 72/0413* (2013.01); *H04W 72/0453* (2013.01); *H04W 74/04* (2013.01); *H04J 2011/0096* (2013.01); *H04L 5/0023* (2013.01); *H04W 84/12* (2013.01); *Y02B 60/50* (2013.01)

(58) Field of Classification Search
CPC .......... H04W 72/042; H04W 74/0808; H04W 72/082; H04W 74/0816; H04L 5/0007; H04L 5/0048; H04L 5/0055; H04L 27/26; H04L 27/2613
See application file for complete search history.

(56) References Cited

U.S. PATENT DOCUMENTS

| | | | | |
|---|---|---|---|---|
| 9,729,368 | B2* | 8/2017 | Suh | H04L 27/2602 |
| 9,756,150 | B2* | 9/2017 | Wentink | H04L 69/18 |
| 2011/0110348 | A1 | 5/2011 | Lee et al. | |
| 2015/0117227 | A1* | 4/2015 | Zhang | H04L 1/0057 370/245 |
| 2015/0131627 | A1* | 5/2015 | Wentink | H04L 69/18 370/336 |
| 2015/0131756 | A1* | 5/2015 | Suh | H04L 27/2602 375/295 |
| 2015/0237178 | A1* | 8/2015 | Zhang | H04L 69/22 370/328 |
| 2016/0072654 | A1* | 3/2016 | Choi | H04L 27/2602 370/329 |
| 2016/0249381 | A1* | 8/2016 | Choi | H04W 74/06 |
| 2016/0330765 | A1* | 11/2016 | Levy | H04W 74/04 |

FOREIGN PATENT DOCUMENTS

| | | |
|---|---|---|
| WO | WO-2013081663 A1 | 6/2013 |
| WO | WO-2015076856 A1 | 5/2015 |

OTHER PUBLICATIONS

"International Application Serial No. PCT/US2013/075418, International Preliminary Report on Patentability dated Jun. 2, 2016", 6 pgs.

Chun, Jinyoung, et al., "Legacy Support on HEW frame structure", IEEE 11-13/1057r0, (Sep. 1, 2013), 8 pgs.

Hongyuan, Zhang, "11ah preamble for 2MHz and beyond ;11-11-1483-02-00ah-11ah-preamble-for-2mhzand-beyond", IEEE Draft; 11-11-1483-02-00AH-11AH-PREAMBLE-F0R-2MHZAND-BEYOND, IEEE—SA Mentor, Piscataway, NJ USA, vol. 802.11ah, No. 2, (01/162012), 1-24.

Jianhan, Liu, "Summary and Discussions of Proposals on Potential PHY Technologies in HEW 11-13-1375-01-0hew-summary-and-di scussions -of-proposals-on-potential-phy-technologies-in-hew", IEEE Draft; 11-13-1375-01-0HEW-SUMMARY-AND-DISCUSSIONS-OF-PROPOSALS-ON-POTENTIAL-PHY-TECHNOLOGIES-IN-HEW, IEEE—SA Mentor, Piscataway, NJ USA, vol. 802.11 HEW, No. 1,, (Nov. 12, 2013), 1-15.

Koskela, Timo, et al., "Discussion on Potential Techniques for HEW", In: IEEE P802.11—High Efficiency WLAN Study Group, [Online] Retrieved from the Internet : <http://www.ieee802.org/11/Reports/hew_update.html>, (Jul. 15, 2013), 13 pgs.

Minyoung, Park, "MAC efficiecy analysis for HEW SG ;11-13-0505-00-0hew-mac-efficiecy-analysi sfor-hew-sg", IEEE SA Mentor; 11-13-0505-00-0HEW-MAC-EFFICIECY-ANALYSISFOR-HEW-SG, IEEE—SA Mentor, Piscataway, NJ USA, vol. 802.11 HEW, (May 14, 2013), 1-13.

"International Application Serial No. PCT/US2013/075418, International Search Report dated Aug. 19, 2014", 3 pgs.

"International Application Serial No. PCT/US2013/075418, Written Opinion dated Aug. 19, 2014", 4 pgs.

Al-Ghazu, Nader, "A Study of the Next WLAN Standard IEEE 802.11ac Physical Layer", Master of Science Thesis Stockholm, (Jan. 2013).

Zhang, Wenxuan, et al., "A novel high throughput long training field sequence design for Next-generation WLAN", Wireless Telecommunications Symposium (WTS), (Apr. 2011).

* cited by examiner

HEW PACKET STRUCTURE AND METHOD FOR HIGH-EFFICIENCY WI-FI (HEW) COMMUNICATION

PRIORITY CLAIM

This application is a U.S. National Stage Filing under 35 U.S.C. 371 from International Application No. PCT/US2013/075418, filed Dec. 16, 2013 and published in English as WO 2015/076856 on May 28, 2015, which claims the benefit of priority to U.S. Provisional Patent Application Ser. No. 61/906,059, filed Nov. 19, 2013, which is incorporated herein by reference in its entirety.

TECHNICAL FIELD

Embodiments pertain to wireless networks. Some embodiments relate to Wi-Fi networks and networks operating in accordance with one of the IEEE 802.11 standards. Some embodiments relate to high-efficiency wireless or high-efficiency Wi-Fi (HEW) communications.

BACKGROUND

Wireless communications has been evolving toward ever increasing data rates (e.g., from IEEE 802.11a/g to IEEE 802.11n to IEEE 802.11ac). In high-density deployment situations, overall system efficiency may become more important than higher data rates. For example, in high-density hotspot and cellular offloading scenarios, many devices competing for the wireless medium may have low to moderate data rate requirements (with respect to the very high data rates of IEEE 802.11ac). The frame structure used for conventional and legacy IEEE 802.11 communications including very-high throughput (VHT) communications may be less suitable for such high-density deployment situations. A recently-formed study group for Wi-Fi evolution referred to as the IEEE 802.11 High Efficiency Wi-Fi (HEW) study group (SG) is addressing these high-density deployment scenarios.

Thus, there are general needs for devices and methods that improve overall system efficiency in wireless networks, particularly for high-density deployment situations. There are also general needs for devices and methods suitable for HEW communications. There are also general needs for devices and methods suitable for HEW communications that can coexist with legacy devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
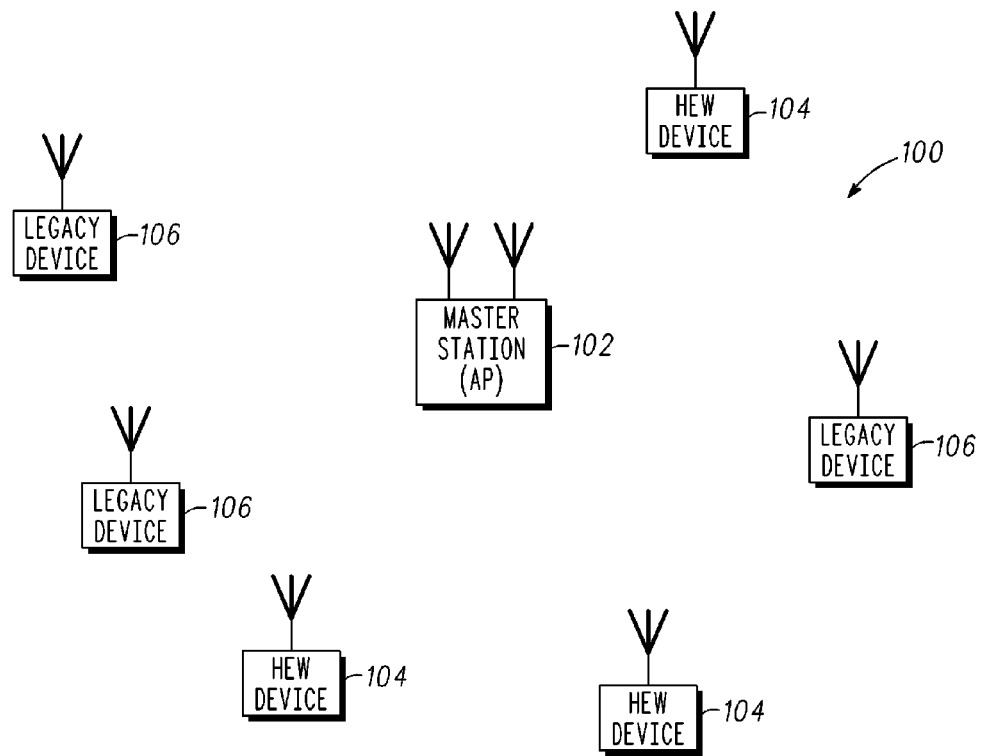
FIG. 1 illustrates a High Efficiency Wi-Fi (HEW) network in accordance with some embodiments.

FIG. 1 illustrates a High Efficiency Wi-Fi (HEW) network in accordance with some embodiments. HEW network 100 may include a master station (STA) 102, a plurality of HEW devices 104 (HEW stations), and a plurality of legacy devices 106 (legacy stations). The master station 102 may be arranged to communicate with the HEW devices 104 and the legacy devices 106 in accordance with one or more of the IEEE 802.11 standards. In some embodiments, the master station 102 may be an access point, base station or an enhanced Node B (eNB).

In accordance with embodiments, the master station 102 may include physical layer (PHY) and medium-access control layer (MAC) circuitry which may be arranged to contend for a wireless medium during a contention period to receive exclusive control of the medium for an HEW control period (i.e., a TXOP), and transmit a master-sync transmission (e.g., an HEW control and schedule transmission) at the beginning of the HEW control period. The master-sync transmission may include at least a schedule indicating channel resources for communications with at least some of the HEW devices 104 during the HEW control period. During the HEW control period, the HEW devices 104 may communicate with the master station 102 in accordance with a non-contention based multiple access technique. This is unlike conventional Wi-Fi communications in which devices communicate in accordance with a contention-based communication technique, rather than a multiple access technique.

In accordance with embodiments, the master station 102 may configure an HEW frame to include an HEW Signal field as a first field of the frame and may transmit the HEW frame without at least legacy synchronization information (e.g., an L-STF or an L-LTF) at the beginning of the HEW frame. The HEW frame may follow the master sync transmission and may be transmitted during the HEW control period. In these embodiments, the elimination of synchronization information from the HEW frame provides significant PHY level increases in efficiency since the packets can be shorter or the payload portions can be longer. The net effect of such an HEW frame is a reduction in per-packet overhead which may result in an overall improvement in system efficiency, particularly for high-density deployment situations (e.g., high-density hotspot and cellular offloading scenarios) in which many devices competing for the wireless medium may have low to moderate data rate requirements (e.g., shorter packets).

Figure 2A:
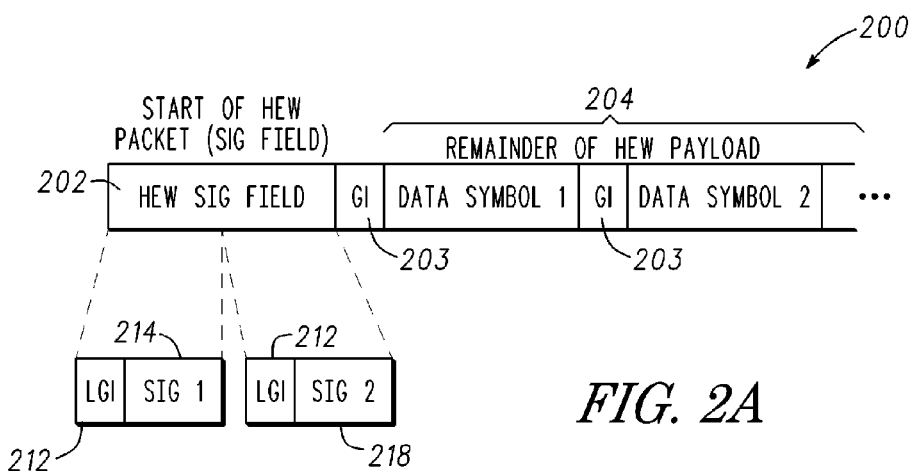
FIG. 2A illustrates an HEW frame in accordance with some embodiments.

FIG. 2A illustrates an HEW frame in accordance with some embodiments. HEW frame 200 may be configured and transmitted by an HEW compliant device, such as master station 102 (FIG. 1) and a HEW device 104 (FIG. 1). HEW frame 200 may be configured to include an HEW Signal field (HEW SIG) 202 as a first field of the HEW frame 200. The HEW SIG 202 may be followed by a data field 204 comprising a number of data symbols. The HEW SIG 202 may be separate from the data field 204 by a guard interval (GI) 203. As illustrated in FIG. 2A, the data symbols of the data field 204 may also be separated by guard intervals 203.

In accordance with embodiments, the HEW frame 200 may be transmitted without synchronization information (i.e., an L-STF or an L-LTF) at the beginning of the HEW frame 200 and the HEW frame 200 may follow the master sync transmission and may be transmitted during the HEW control period. In these embodiments, the master-sync transmission may include synchronization information.

In some embodiments, the synchronization information included in the master sync transmission may include a preamble structure comprising a short-training field (STF) and a long-training field (LTF). In these embodiments, the master station 102 may to refrain from including a short-training field (STF) and a long-training field (LTF) at the beginning of the HEW frame 200. In some of these embodiments, the STF and the LTF included in the master-sync transmission may comprise a legacy STF (L-STF) and a legacy LTF (L-LTF), although this is not a requirement as non-legacy training fields may also be used.

In some alternate embodiments, the HEW frame 200 may include at least some synchronization information, such as a training field that is shorter than the L-STF or shorter than the L-LTF. In these embodiments, the HEW SIG 202 may follow this shorter training field, although the scope of the embodiments is not limited in this respect.

In some embodiments, the master station 102 is further arranged to configure the HEW frame 200 to include a data field 204 followed by a normal-length guard interval (GI) 203. The data field 204 may comprise one or more data symbols.

In some embodiments, the HEW SIG 202 may include a first orthogonal frequency division multiplexed (OFDM) symbol (HEW SIG-1) 214 and a second OFDM symbol (HEW SIG-2) 218. In some embodiments, the HEW SIG 202 includes a long guard interval (LGI) 212 preceding the HEW SIG-1 214. The long guard interval 212 may be longer than the normal-length guard interval 203. In some embodiments, the LGI 212 may be twice as long as the normal length GI 203, although other lengths of the LGI 212 may also be suitable in which the LGI is longer than the normal-length GI 203. In some embodiments, the HEW SIG-2 218 may be preceded with a second long guard interval 212.

In the embodiments illustrated in FIG. 2A, each of the first two OFDM symbols of the HEW frame 200 may be preceded with a long guard interval. In some embodiments, only the first symbol is preceded with a long-guard interval, while in other embodiments, up to three or more (up to N) of the initial symbols may be preceded with a long-guard interval. The long guard interval may allow for a more reliable packet reception of the HEW SIG 202 of the HEW frame 200 by HEW compliant devices 104.

In some embodiments, the master station may refrain from including a LGI 212 preceding the first OFDM symbol 214 and preceding the second OFDM symbol 218 of the HEW SIG field 202 when the HEW devices 104 are configured to meet tighter frequency drift requirements. The master station 102 may include the LGI 212 preceding the first OFDM symbol and preceding the second OFDM symbol 218 of the HEW SIG field 202 when the HEW devices 104 are not configured to meet tighter frequency drift requirements. In these embodiments, the tighter frequency drift requirements may include a tighter voltage controlled oscillator (VCO) requirement (e.g., better than +/−20 PPM) although the scope of the embodiments is not limited in this respect. In some embodiments, the longer GI 212 may be also used for channels with longer delay spread.

In some embodiments, the HEW SIG 202 may be configured with BPSK modulation and a coding rate of one-half. The data fields 204 may be configured with a higher-order modulation and coding scheme (MCS) than BPSK modulation and a coding rate of one-half. Examples of higher-order MCS include 16 QAM, 32 QAM, 64 QAM and 256 QAM with various coding rates. The use of a lower level MCS for the HEW SIG 202 allows the HEW SIG 202 portion of the packet to have a higher signal-to-noise ratio (SNR) per bit allowing the HEW SIG 202 to be detected and decoded with estimates that are less than optimal.

In some embodiments, the HEW control period may be an orthogonal frequency division multiple access (OFDMA) control period and the multiple access technique may be an OFDMA technique. In other embodiments, the multiple access technique may be a time-division multiple access (TDMA) technique (e.g., if a single frequency channel is being controlled) or a frequency-division multiple access (FDMA) technique.

As discussed above, the master sync transmission may include least a schedule indicating channel resources for communicating with a plurality of HEW devices 104 during the HEW control period in accordance with multiple access technique. In these embodiments, the HEW frame 200 may be configured to include a plurality of data fields 204 which may include at least one data field 204 for each of the HEW devices scheduled to communicate during the HEW control period. In some of these embodiments, OFDMA and TDMA control periods, for example, may coexist.

In some embodiments, wherein the channel resources indicated in the master sync transmission may comprise subspaces within a wideband legacy channel bandwidth. The subspaces may comprise time-frequency resources for HEW channels having HEW channel bandwidths. In these embodiments, the HEW devices 104 that are assigned or allocated time-frequency resources for communicating during the HEW control period in accordance with a multiple-access technique and do not need to contend for the channel, as with conventional IEEE 802.11 communications.

In some embodiments, the HEW SIG 202 may include a single bit 204 to indicate whether the HEW frame 200 is a single user (SU) HEW frame or a multi-user (MU) HEW frame. In these embodiments, the master station 102 may be arranged to refrain from including a legacy signal field (L-SIG) in the HEW frame 200 and may include rate and length information in one or more signal fields of the HEW frame 200.

In some embodiments, the HEW SIG-A1 214 may include a length field to indicate a length of a packet-protocol data unit (PPDU) when the HEW frame 200 is an SU HEW frame, and the HEW SIG-A2 218 may indicate at least rate information comprising a modulation and coding scheme (MCS) of the one or more data fields of the HEW frame.

A conventional or legacy IEEE 802.11 frame (e.g., an IEEE 802.11ac frame) includes an L-STF (Legacy Short Training Field) and an L-LTF (Legacy Long Training Field). The L-STF consists of 10 repetitions of a sequence known as the Short Training Sequence (STS). This repetitive pattern is used by the receiver for several critical mechanisms for signal detection and acquisition. The STF is typically used for start of packet detection, AGC settling, coarse frequency offset estimation and symbol timing or boundary timing. The exact use and technique to arrive at these parameters can vary based on implementation. The L-LTF uses two repetitions of the Long Training Sequence (LTS), in addition to a guard interval. The LTF is typically used for fine frequency and timing offset estimation in addition to channel estimation. At the end of the L-LTF the device should have the AGC settled, the frequency and timing offset pulled into an acceptable level to detect and effectively demodulate the data portion. Additionally, an estimate of the channel may have also been attained.

Unlike conventional IEEE 802.11 frames, embodiments of HEW frame 200 do not include either the L-STF or the L-LTF and is more aggressive in attaining better PHY efficiency. In accordance with embodiments, HEW devices 104 may use the synchronization information attained during the reception of the HEW Master Sync transmission to start the HEW compatible device exchanges. In this initial transmission to all HEW devices 104, the full preamble structure may be used. This information is retained and used as a starting point at a later time to detect/decode the packet during devices scheduled time. To address any small changes in the estimated parameters that may occur during this time, the first few OFDM symbols may have a modified structure than that of the IEEE 802.11 n/ac standards. In accordance with embodiments, the symbol time of the first few symbols is modified to use a longer guard interval as opposed to a normal guard interval. After these first few symbols with the longer GI (i.e., LGI 212), the remaining of the OFDM symbols in the payload may use the normal GI length (i.e., GI 203). In some embodiments, the longer guard interval may be twice (1.6 us) the current normal guard interval (0.8 us). After the initial few OFDM symbol with a longer GI, the remaining of the payload would use the normal GI length. During the first N OFDM symbols with the longer GI, the receiver may use those symbols (pilot tones) to track out the frequency/timing error. With the omission of the STF and LTF, the packet (e.g., HEW frame 200) begins with the transmission of a SIG field.

For the slave devices (e.g., HEW devices 104) there may be a residual error in the original time/frequency estimates during the master-sync transmission. Depending when in the HEW Control period the slave is active will bound how large the error will be. As mentioned, the target is to extend the GI for the first N symbols in the transmission and to use the SIG field 202 as the first field. One benefit of using the SIG field 202 for the larger GI is that the payload uses a modulation and coding (MCS) of MCS 0 (BPSK modulation and rate ½ coding), which allows for reliable reception of the SIG even with estimation errors as compared to higher order modulation formats used in the payload portion of the packet. Therefore, since the SIG field uses BPSK and the payload will use higher order modulation like 16/64/256 QAM, the SIG portion of the packet may have a higher SNR per bit. This allows the SIG to be detected and decoded with estimates that are less than optimal. HEW exchanges will largely target the use of higher MCSs since HEW exchanges will be used in high density scenarios and the transmission exchanges will group users to improve efficiency. Thus, using a MCS 0 would not provide any efficiency improvements, and could likely hurt efficiency when considering the overhead of setting up the HEW exchange.

Accordingly, these embodiments may be able to serve devices with higher SNR during the HEW control period and letting the low MCS devices contend for the medium on their own. Using a longer guard interval for the first symbols provides a more robust system to deal with any clock drift and potentially small channel state changes. Having the short or normal guard interval, while potentially sufficient in most cases, could lead to cases where the system performance suffers. As an example, if the delay spread of the channel is long, where most of the normal GI is required to demodulate without destroying the orthogonality between subcarriers, then any additional timing error could be catastrophic. Having a longer GI affords some freedom in having initial estimation errors that lead to drift.

In some embodiments, a mix of preambles may be used in a HEW control period. This would allow a mix of devices based on performance, channel conditions (stationary or mobile) or even device categories. The new packet structure outlined above provides the benefit of increased PHY efficiency for HEW. In embodiments, the new packet structure of an HEW frame 200 will no longer have an L-STF and L-LTF, and additionally, the first few symbols may have a longer GI and then transition to a normal GI for the remainder of the packet. The approach can provide significant PHY efficiency increases, as a limiting case (assuming legacy STF/LTF/SIG and high-throughput (HT)-SIG) the gain can be as high as 43% assuming short packets and 100% HEW control channel utilization. As the payload is increased or HEW channel utilization decreases the gains degrade, but with the new usage scenarios of high density deployments where potentially many tens or hundreds of devices are using the system the efficiency gains by such a preamble are now well justified and will help in providing overall system efficiency gains to meet the HEW targets.

Figure 2B:
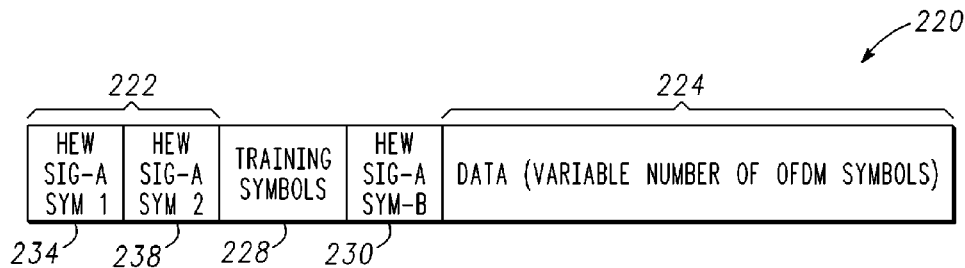
FIG. 2B illustrates an HEW frame in accordance with some alternate embodiments.

FIG. 2B illustrates an HEW frame in accordance with some alternate embodiments. HEW frame 220 may be configured and transmitted by an HEW compliant device, such as master station 102 (FIG. 1) and a HEW device 104 (FIG. 1). In these embodiments, HEW frame 220 may include the HEW SIG 222 as a first field of the HEW frame 220, training symbols 228, HEW signal field (HEW SIG-B) 230, and the data field 224. The HEW SIG 222 may correspond to HEW SIG 202 (FIG. 2A) of HEW frame 200 (FIG. 2A) and the data field 224 may correspond to data field 204 (FIG. 2A) of HEW frame 200 (FIG. 2A). The HEW SIG 222 may include HEW SIG-A (SYM 1)) 234 and HEW SIG-A (SYM 2) 238 corresponding to the first OFDM symbol 214 (FIG. 2A) and the second OFDM symbol 218 (FIG. 2A) respectively. As discussed above, a longer GI may precede the HEW SIG-A (SYM 1) 234 and the HEW SIG-A (SYM 2) 238 and a normal length GI may precede the subsequent fields of HEW frame 220. In some embodiments, each data symbol of data field 224 may be preceded by a normal length GI.

In some embodiments, the HEW training symbols 228 may comprise training sequences in the form of OFDM symbols. In some embodiments, the training symbols may be specifically designated for HEW communications, although this is not a requirement. The data field 224 may be configurable to comprise a variable number of coded OFDM symbols. The HEW SIG-B 230 may be configured based on bandwidth. In some embodiments, the fields of HEW frame 220 may correspond to the fields of a legacy packet structure for IEEE 802.1 lac in which the HEW SIG-A (SYM 1) 234 corresponds to VHT SIG-A (SYM 1), HEW SIG-A (SYM 2) 238 corresponds to VHT SIG-A (SYM 2), HEW training symbols 228 correspond to VHT training symbols, and HEW SIG-B 230 corresponds to VHT SIG-B. In these embodiments, HEW frame 220 may be a VHT frame without an L-STF, an L-LTF or an L-SIG (e.g., legacy synchronization information), although the scope of the embodiments is not limited in this respect.

Figure 3:
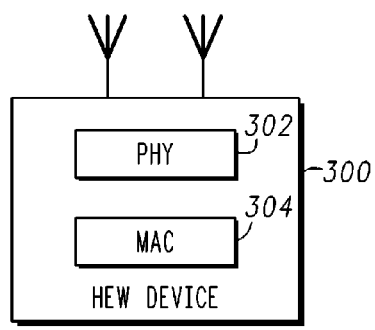
FIG. 3 illustrates an HEW compliant device in accordance with some embodiments.

FIG. 3 illustrates an HEW compliant device in accordance with some embodiments. HEW compliant device 300 may be any HEW compliant wireless communication device that may be arranged to communicate with one or more other HEW compliant devices as well as communicate with legacy devices. HEW compliant device 300 may serve as a master station, such as master station 102 (FIG. 1) or any one of HEW devices 104 (FIG. 1).

HEW compliant device 300 may be arrange to configure an HEW frame, such as HEW frame 200 (FIG. 2A) or HEW frame 220 (FIG. 2B), for communicating with HEW compliant devices. In accordance with embodiments, HEW compliant device 300 may include, among other things, physical layer (PHY) 302 and medium-access control layer (MAC) 304. PHY 302 and MAC 304 may be HEW compliant layers and may also be compliant with one or more legacy IEEE 802.11 standards.

HEW compliant device 300, when operating as a master station, may be arranged to transmit a master sync transmission that includes synchronization information. The master sync transmission may be transmitted at a beginning of an HEW control period. The HEW compliant device 300 may configure an HEW frame to include an HEW Signal field (HEW SIG) as a first field of the frame and may transmit the HEW frame without legacy synchronization information at the beginning of the HEW frame. The HEW control period may be an OFDMA control period or a TDMA control period.

In some embodiments, the HEW compliant device 300 may be configured to communicate using OFDM communication signals over a multicarrier communication channel. In some embodiments, HEW compliant device 300 may be configured to receive signals in accordance with specific communication standards, such as the Institute of Electrical and Electronics Engineers (IEEE) standards including IEEE 802.11-2012 and/or 802.11n-2009 standards and/or proposed specifications for WLANs including proposed HEW standards, although the scope of the invention is not limited in this respect as they may also be suitable to transmit and/or receive communications in accordance with other techniques and standards. In some other embodiments, HEW compliant device 300 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, HEW compliant device 300 may be part of a portable wireless communication device, such as a personal digital assistant (PDA), a laptop or portable computer with wireless communication capability, a web tablet, a wireless telephone or smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, HEW compliant device 300 may include one or more of a keyboard, a display, a non-volatile memory port, multiple antennas, a graphics processor, an application processor, speakers, and other mobile device elements. The display may be an LCD screen including a touch screen.

The antennas may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result between each of antennas and the antennas of a transmitting station.

Although HEW compliant device 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of HEW compliant device 300 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 4:
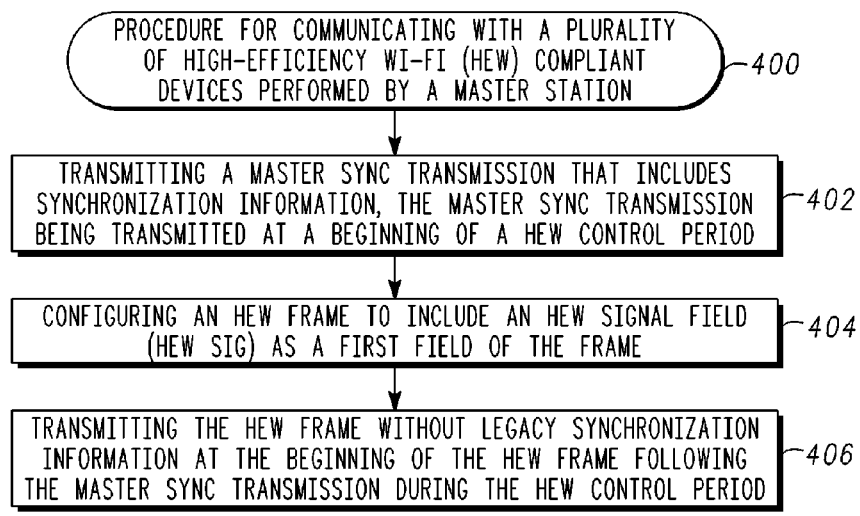
FIG. 4 is a procedure for communicating with a plurality of HEW compliant devices performed by a master station in accordance with some embodiments.

FIG. 4 is a procedure 400 for communicating with a plurality of HEW compliant devices performed by a master station in accordance with some embodiments. In some embodiments, HEW compliant device 300 (FIG. 3) may be suitable for performing procedure 400.

Operation 402 includes transmitting a master sync transmission that includes synchronization information. The master sync transmission may be transmitted at a beginning of an HEW control period.

Operation 404 includes configuring an HEW frame to include an HEW Signal field (HEW SIG) as a first field of the frame. An example of an HEW frame may include HEW frame 200 (FIG. 2).

Operation 406 includes transmitting the HEW frame without legacy synchronization information at the beginning of the HEW frame. The HEW frame may follow the master sync transmission and may be transmitted during the HEW control period.

In an example, a master station is arranged to configure an HEW frame for communicating with a plurality of HEW compliant devices. The master station comprises physical layer and medium access control circuitry arranged to transmit a master sync transmission that includes synchronization information, the master sync transmission being transmitted at a beginning of an HEW control period, configure an HEW frame to include an HEW Signal field (HEW SIG) as a first field of the frame, and transmit the HEW frame without legacy synchronization information at the beginning of the HEW frame, the HEW frame following the master sync transmission and being transmitted during the HEW control period.

In an example, the synchronization information included in the master sync transmission comprises a preamble structure comprising a short-training field (STF) and a long-training field (LTF) and he master station is to refrain from including a short-training field (STF) and a long-training field (LTF) at the beginning of the HEW frame.

In an example, the master station may configure the HEW frame to include a data field followed by a normal-length guard interval (GI), and the HEW SIG includes a long guard interval (LGI) precedes a first orthogonal frequency division multiplexed (OFDM) symbol (HEW SIG-1) of the HEW SIG, the long guard interval being longer than the normal-length guard interval.

In an example, the HEW SIG is further configured to include a second OFDM symbol (HEW SIG-2), the second OFDM symbol being preceded with a second long guard interval.

In an example, the master station is arranged to refrain from including a LGI preceding the first OFDM symbol of the HEW SIG field when the HEW devices are configured to meet tighter frequency drift requirements, and the master station is arranged to include the LGI preceding the first OFDM symbol of the HEW SIG field when the HEW devices are not configured to meet tighter frequency drift requirements.

In an example, the master station is further arranged to contend for a wireless medium during a contention period to receive exclusive control of the medium for the HEW control period, and transmit the master-sync transmission at the beginning of the HEW control period followed by the HEW frame.

In an example, the HEW SIG is configured with BPSK modulation and a coding rate of one-half, and the data fields are configured with a higher-order modulation and coding scheme (MCS) than BPSK modulation and a coding rate of one-half.

In an example, the HEW control period is an orthogonal frequency division multiple access (OFDMA) control period, the master sync transmission includes at least a schedule indicating channel resources for communicating with a plurality of HEW devices during the HEW control period in accordance with an OFDMA technique, wherein the HEW frame is configured to include a plurality of data fields, at least one data field for each of the HEW devices scheduled to communicate during the HEW control period.

In an example, the HEW SIG includes a single bit to indicate whether the HEW frame is a single user (SU) HEW frame or a multi-user (MU) HEW frame, and the master station is further arranged to refrain from including a legacy signal field (L-SIG) in the HEW frame, and include rate and length information in one or more signal fields of the HEW frame.

In an example, the HEW SIG includes a first HEW signal field (HEW SIG-A1) and a second HEW signal field (HEW SIG-A2), the HEW SIG-A1 includes a length field to indicate a length of a protocol data unit when the HEW frame is an SU HEW frame, and the HEW SIG-A2 indicates at least rate information comprising a modulation and coding scheme (MCS) of the one or more data fields of the HEW frame.

In an example, a method for communicating with a plurality of HEW compliant devices is performed by a master station. The method comprises transmitting a master sync transmission that includes synchronization information, the master sync transmission being transmitted at a beginning of an HEW control period, configuring an HEW frame to include an HEW Signal field (HEW SIG) as a first field of the frame, and transmitting the HEW frame without legacy synchronization information at the beginning of the HEW frame, the HEW frame following the master sync transmission and being transmitted during the HEW control period.

In an example, the synchronization information included in the master sync transmission comprises a preamble structure comprising a short-training field (STF) and a long-training field (LTF), and the method further includes refraining from including a short-training field (STF) and a long-training field (LTF) at the beginning of the HEW frame.

In an example, the method comprises configuring the HEW frame to include a data field followed by a normal-length guard interval (GI), and the HEW SIG includes a long guard interval (LGI) precedes a first orthogonal frequency division multiplexed (OFDM) symbol (HEW SIG-1) of the HEW SIG, the long guard interval being longer than the normal-length guard interval.

In an example, the method comprises configuring the HEW SIG to include a second OFDM symbol (HEW SIG-2), the second OFDM symbol being preceded with a second long guard interval.

In an example, the method further comprises refraining from including a LGI preceding the first OFDM symbol of the HEW SIG field when the HEW devices are configured to meet tighter frequency drift requirements, and including the LGI preceding the first OFDM symbol of the HEW SIG field when the HEW devices are not configured to meet tighter frequency drift requirements.

In an example, a non-transitory computer-readable storage medium stores instructions for execution by one or more processors to perform operations for high-efficiency Wi-Fi (HEW) communications. The operations comprise transmitting a master sync transmission that includes synchronization information, the master sync transmission being transmitted at a beginning of an HEW control period, configuring an HEW frame to include an HEW Signal field (HEW SIG) as a first field of the frame, and transmitting the HEW frame without legacy synchronization information at the beginning of the HEW frame, the HEW frame following the master sync transmission and being transmitted during the HEW control period.

In an example, a wireless communication device is configured for high-efficiency Wi-Fi (HEW) communications. The wireless communication device comprises one or more antennas, physical layer circuitry coupled to the one or more antennas, and medium access control circuitry. The physical layer and medium access control circuitry are arranged to transmit, using the one or more antennas, a master sync transmission that includes synchronization information, the master sync transmission being transmitted at a beginning of an HEW control period, configure an HEW frame to include an HEW Signal field (HEW SIG) as a first field of the frame, and transmit, using the one or more antennas, the HEW frame without legacy synchronization information at the beginning of the HEW frame, the HEW frame following the master sync transmission and being transmitted during the HEW control period.

In an example, the synchronization information included in the master sync transmission comprises a preamble structure comprising a short-training field (STF) and a long-training field (LTF), and the physical layer and medium access control circuitry is to refrain from including a short-training field (STF) and a long-training field (LTF) at the beginning of the HEW frame.

In an example, the physical layer and medium access control circuitry is further arranged to configure the HEW frame to include a data field followed by a normal-length guard interval (GI), and the HEW SIG includes a long guard interval (LGI) precedes a first orthogonal frequency division multiplexed (OFDM) symbol (HEW SIG-1) of the HEW SIG, the long guard interval being longer than the normal-length guard interval.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A master station arranged to configure a high-efficiency Wi-Fi (HEW) frame for communicating with a plurality of HEW compliant devices, the master station comprising physical layer and medium access control circuitry arranged to:
transmit a master sync transmission that includes synchronization information, the master sync transmission being transmitted at a beginning of an HEW control period;
configure an HEW frame to include an HEW Signal field (HEW SIG) as a first field of the frame; and
transmit the HEW frame without legacy synchronization information at the beginning of the HEW frame, the HEW frame following the master sync transmission and being transmitted during the HEW control period.

2. The master station of claim 1 wherein the synchronization information included in the master sync transmission comprises a preamble structure comprising a short-training field (STF) and a long-training field (LTF), and
wherein the master station is to refrain from including a short-training field (STF) and a long-training field (LTF) at the beginning of the HEW frame.

3. The master station of claim 2 wherein the master station is further arranged to configure the HEW frame to include a data field followed by a normal-length guard interval (GI), and
wherein the HEW SIG includes a long guard interval (LGI) precedes a first orthogonal frequency division multiplexed (OFDM) symbol (HEW SIG-1) of the HEW SIG, the long guard interval being longer than the normal-length guard interval.

4. The master station of claim 3 wherein the HEW SIG is further configured to include a second OFDM symbol (HEW SIG-2), the second OFDM symbol being preceded with a second long guard interval.

5. The master station of claim 3 wherein the master station is arranged to refrain from including a LGI preceding the first OFDM symbol of the HEW SIG field when the HEW devices are configured to meet tighter frequency drift requirements, and
wherein the master station is arranged to include the LGI preceding the first OFDM symbol of the HEW SIG field when the HEW devices are not configured to meet tighter frequency drift requirements.

6. The master station of claim 3 wherein the master station is further arranged to:
contend for a wireless medium during a contention period to receive exclusive control of the medium for the HEW control period; and
transmit the master-sync transmission at the beginning of the HEW control period followed by the HEW frame.

7. The master station of claim 3 wherein the HEW SIG is configured with BPSK modulation and a coding rate of one-half, and
wherein the data fields are configured with a higher-order modulation and coding scheme (MCS) than BPSK modulation and a coding rate of one-half.

8. The master station of claim 3 wherein the HEW control period is an orthogonal frequency division multiple access (OFDMA) control period,
wherein the master sync transmission includes at least a schedule indicating channel resources for communicating with a plurality of HEW devices during the HEW control period in accordance with an OFDMA technique, and
wherein the HEW frame is configured to include a plurality of data fields, at least one data field for each of the HEW devices scheduled to communicate during the HEW control period.

9. The master station of claim 8 wherein the HEW SIG includes a single bit to indicate whether the HEW frame is a single user (SU) HEW frame or a multi-user (MU) HEW frame, and
wherein the master station is further arranged to:
refrain from including a legacy signal field (L-SIG) in the HEW frame; and
include rate and length information in one or more signal fields of the HEW frame.

10. The master station of claim 9 wherein the HEW SIG includes a first HEW signal field (HEW SIG-A1) and a second HEW signal field (HEW SIG-A2),
wherein the HEW SIG-A1 includes a length field to indicate a length of a protocol data unit when the HEW frame is an SU HEW frame, and
wherein the HEW SIG-A2 indicates at least rate information comprising a modulation and coding scheme (MCS) of the one or more data fields of the HEW frame.

11. A method for communicating with a plurality of high-efficiency Wi-Fi (HEW) compliant devices performed by a master station, the method comprising:
transmitting a master sync transmission that includes synchronization information, the master sync transmission being transmitted at a beginning of an HEW control period;
configuring an HEW frame to include an HEW Signal field (HEW SIG) as a first field of the frame; and
transmitting the HEW frame without legacy synchronization information at the beginning of the HEW frame, the HEW frame following the master sync transmission and being transmitted during the HEW control period.

12. The method of claim 11 wherein the synchronization information included in the master sync transmission comprises a preamble structure comprising a short-training field (STF) and a long-training field (LTF), and
wherein the method further includes refraining from including a short-training field (STF) and a long-training field (LTF) at the beginning of the HEW frame.

13. The method of claim 12 further comprising configuring the HEW frame to include a data field followed by a normal-length guard interval (GI), and
wherein the HEW SIG includes a long guard interval (LGI) precedes a first orthogonal frequency division multiplexed (OFDM) symbol (HEW SIG-1) of the HEW SIG, the long guard interval being longer than the normal-length guard interval.

14. The method of claim 13 further comprising configuring the HEW SIG to include a second OFDM symbol (HEW SIG-2), the second OFDM symbol being preceded with a second long guard interval.

15. The method of claim 13 further comprising:
refraining from including a LGI preceding the first OFDM symbol of the HEW SIG field when the HEW devices are configured to meet tighter frequency drift requirements; and including the LGI preceding the first OFDM symbol of the HEW SIG field when the HEW devices are not configured to meet tighter frequency drift requirements.

16. A non-transitory computer-readable storage medium that stores instructions for execution by one or more processors to perform operations for high-efficiency Wi-Fi (HEW) communications, the operations comprising:
   transmitting a master sync transmission that includes synchronization information, the master sync transmission being transmitted at a beginning of an HEW control period;
   configuring an HEW frame to include an HEW Signal field (HEW SIG) as a first field of the frame; and
   transmitting the HEW frame without legacy synchronization information at the beginning of the HEW frame, the HEW frame following the master sync transmission and being transmitted during the HEW control period.

17. The non-transitory computer-readable storage medium of claim 16 wherein the synchronization information included in the master sync transmission comprises a preamble structure comprising a short-training field (STF) and a long-training field (LTF), and
   wherein the operations further include refraining from including a short-training field (STF) and a long-training field (LTF) at the beginning of the HEW frame.

18. A wireless communication device configured for high-efficiency Wi-Fi (HEW) communications comprising:
   one or more antennas;
   physical layer circuitry coupled to the one or more antennas; and
   medium access control circuitry,
   wherein the physical layer and medium access control circuitry are arranged to:
   transmit, using the one or more antennas, a master sync transmission that includes synchronization information, the master sync transmission being transmitted at a beginning of an HEW control period;
   configure an HEW frame to include an HEW Signal field (HEW SIG) as a first field of the frame; and
   transmit, using the one or more antennas, the HEW frame without legacy synchronization information at the beginning of the HEW frame, the HEW frame following the master sync transmission and being transmitted during the HEW control period.

19. The wireless communication device of claim 18 wherein the synchronization information included in the master sync transmission comprises a preamble structure comprising a short-training field (STF) and a long-training field (LTF), and
   wherein the physical layer and medium access control circuitry is to refrain from including a short-training field (STF) and a long-training field (LTF) at the beginning of the HEW frame.

20. The wireless communication device of claim 19 wherein the physical layer and medium access control circuitry is further arranged to configure the HEW frame to include a data field followed by a normal-length guard interval (GI), and
   wherein the HEW SIG includes a long guard interval (LGI) precedes a first orthogonal frequency division multiplexed (OFDM) symbol (HEW SIG-1) of the HEW SIG, the long guard interval being longer than the normal-length guard interval.

\* \* \* \* \*

UNITED STATES PATENT AND TRADEMARK OFFICE
CERTIFICATE OF CORRECTION

PATENT NO. : 9,883,505 B2
APPLICATION NO. : 15/022477
DATED : January 30, 2018
INVENTOR(S) : Kenney et al.

It is certified that error appears in the above-identified patent and that said Letters Patent is hereby corrected as shown below:

On the Title Page

On page 2, in Column 2, under "Other Publications", Line 7, delete "2mhzand-beyond"," and insert --2mhz and beyond",-- therefor On page 2, in Column 2, under "Other Publications", Line 10, delete "(01/162012)" and insert --(Jan. 16, 2012)-- therefor On page 2, in Column 2, under "Other Publications", Lines 12-13, delete "11-13-1375-01-0hew-summary-and-di scussions -of-proposals-on-potential-phy-technologies-in-hew"," and insert --11-13-1375-01-0 hew-summary-and-discussions-of-proposals-on-potential-phy-technologies-in-hew",-- therefor On page 2, in Column 2, under "Other Publications", Line 22, delete "efficiecy" and insert --efficiency-- therefor On page 2, in Column 2, under "Other Publications", Lines 22-23, delete "11-13-0505-00-0hew-mac-efficiecy-analysi sfor-hew-sg"," and insert --11-13-0505-00-0 hew-mac-efficiency-analysis for-hew-sg",-- therefor Signed and Sealed this
Fourteenth Day of April, 2020

Andrei Iancu
*Director of the United States Patent and Trademark Office*